United States Patent
Bailey et al.

[15] 3,648,461
[45] Mar. 14, 1972

[54] SOLID PROPELLENT ROCKET MOTOR NOZZLE

[72] Inventors: Richard L. Bailey, Lancaster; Warren L. Dowler, Sierra Madre; John I. Shafer, Pasadena, all of Calif.

[73] Assignee: The United States of America as represented by the Administrator of the National Aeronautics and Space Administration

[22] Filed: May 13, 1970

[21] Appl. No.: 36,926

[52] U.S. Cl. .................................................. 60/271, 60/266
[51] Int. Cl. .................................................. F02k 1/00
[58] Field of Search .................. 60/39.31, 39.32, 264, 266, 60/271

[56] References Cited

UNITED STATES PATENTS

| | | |
|---|---|---|
| 3,372,548 | 3/1968 | Mathis et al. ............................. 60/271 |
| 3,212,257 | 10/1965 | Frey et al. ................................ 60/271 |
| 3,187,503 | 6/1965 | Taylor ..................................... 60/271 |
| 3,133,411 | 5/1964 | McCorkle ................................ 60/271 |
| 3,200,585 | 8/1965 | Climent et al. ......................... 60/39.32 |
| 2,939,275 | 6/1960 | Loedding ................................. 60/271 |

Primary Examiner—Mark M. Newman
Assistant Examiner—Warren Olsen
Attorney—John R. Manning, Monte F. Mott and Wilfred Grifka

[57] ABSTRACT

A solid propellent motor comprised of a metal casing for containing the solid propellent charge, a thin wall nozzle formed of carbon or graphite fibers or filaments, disposed in a carbon or graphite binder; the nozzle is affixed to the high strength case by an elongated transition section formed of a carbonaceous material reinforced with carbonaceous fibers. The nozzle expansion cone has an insulative nonablative covering thereon to prevent undue radiation of heat, and the transition section has an insulative layer of ablative or nonablative material to control the heat path to the metal casing.

10 Claims, 1 Drawing Figure

PATENTED MAR 14 1972                               3,648,461
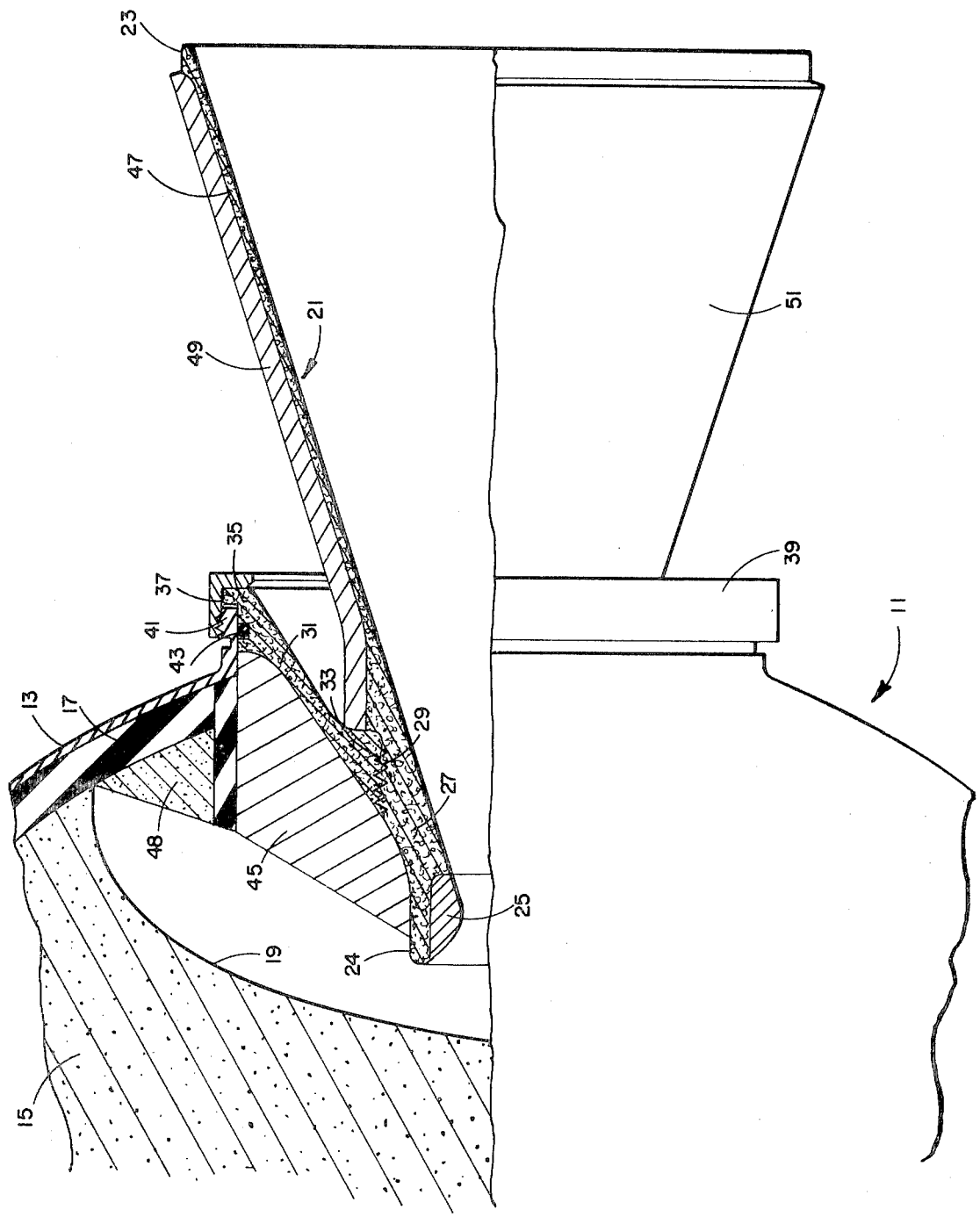
INVENTORS
RICHARD L. BAILEY
WARREN L. DOWLER
JOHN I. SHAFER
BY
SOKOLSKI & WOHLGEMUTH
ATTORNEYS

SOLID PROPELLENT ROCKET MOTOR NOZZLE

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

1. Field of the Invention

This invention is in the field of rocket motors. More particularly, the invention relates to a light weight nozzle designed for solid propellant rocket motors and a means of attaching the nozzle to a rocket motor casing to prevent extreme heat dissipation into the casing.

2. Description of the Prior Art

Most prior art nozzles for solid propellant application have been made of an ablative material such as carbon, silica, or glass cloth, or fibers, in a phenolic resin binder. The ablative material normally comprised a relatively thick layer in the nozzle and thus often provided somewhat of a weight penalty. Further, as the rocket motor burns, the nozzle materials, due to their ablative nature, are progressively eroded and thermally decomposed by the hot propellant combustion gases, increasing with length of burning time. This is often tolerable where the rocket motor has a short burning duration. However, for relatively long burning times, the change in nozzle weight and configuration is very undesirable because of the lower motor performance that stems from the added weight of the ablative material. Thus it is desirable to decrease the weight contribution of the nozzle. The nozzle thickness ablated away increases with increasing burning time, i.e., approximately in proportion to the square root of the burning time for a given propellant and chamber pressure, so that increasing burning times require increasing nozzle wall thicknesses. Non-ablating radiating nozzles which used a graphite throat insert in a steel nozzle body have been used successfully in the past for short duration applications but as the ablative type nozzle became available, the metal nozzle was supplanted because of its prohibitive weight, especially for medium and long duration applications.

In liquid propellant motors, ablative nozzles have also been utilized together with various cooled nozzles formed of high temperature metals. Further, in some liquid propellent motors a nozzle and chamber formed of a graphite or carbon binder reinforced with graphite or carbon fibers has been utilized, which is a material similar to that to be used in the herein invention. However, when used in a liquid propellent motor, the carbonaceous nozzle does not present severe design problems since the attachment region of the motor can be adequately cooled by liquid coolant in the injector plate, the attachment plane, and thus heat radiation and conduction from the nozzle and motor body to the spacecraft does not pose a design problem. In neither the liquid propellant or solid propellant radiating nozzle has the attempt been made to cool the graphite parts themselves.

Solid propellent motors for applications that require relatively long burning times and high performance do not currently have nozzles that are sufficiently light in weight; the proposed concept offers a method of meeting those requirements.

SUMMARY OF THE INVENTION

The herein invention comprises a thin-wall nozzle formed of a composite material having graphite or carbon fibers or filaments disposed in the graphite or carbon binder matrix. The nozzle may consist of the same material throughout or have a separate graphite insert positioned in the throat thereof. The nozzle is attached to a high strength metal or composite rocket motor chamber by means of a separate transition section that is preferably frusto-conically shaped to provide structural support and an elongated surface for heat dissipation and insulation. The transition section or piece is formed of a material similar to that of the nozzle, namely a material having graphite or carbon fibers disposed in the graphite or carbonaceous matrix. When the throat area of the nozzle is submerged within the rocket motor chamber in order to shorten the overall length of the rocket motor assembly, it is preferred that the frusto-conically shaped transition section be affixed inwardly of the rocket motor housing, radiating outwardly toward the casing such that it be in compression during the firing of the rocket motor. For external rather than submerged nozzles, the transition section would consist of a cylindrical, rather than frusto-conical, section which would be in tension rather than compression between the chamber's nozzle attachment ring and an attachment ring on the nozzle expansion cone. The length of the cylindrical transition would be determined by the thermal lag needed to protect the motor case.

Where the rocket motor is to be utilized with temperature-sensitive space components such as solar panels, it is important that heat radiation from the nozzle be minimized. As one of the novel features of the herein invention, a protective insulative barrier of a material such as a graphite felt insulation surrounds the nozzle. This insulation layer serves to in fact raise the temperature of the nozzle by severely limiting heat dissipation therefrom. It is believed that the invention will be further understood from the following detailed description and drawings:

DESCRIPTION OF THE DRAWING

The FIGURE is a cross-sectional view of a solid propellent rocket motor containing the novel nozzle design of this invention.

DESCRIPTION OF THE PREFERRED EMBODIMENTS

For various spacecraft applications, it is desirable to have a high performance rocket motor, that is, one that has a high propellant to total weight ratio. Where the motor is to be utilized for orbit insertion, it is additionally necessary that the high performance be accompanied, for a three axis attitude stabilized spacecraft, by a minimum acceleration or thrust. For example, where solar panels are placed in orbit, the acceleration that can be sustained by the panels is on the order of only 1 G when they are in their extended position during retrofire. Further, a low acceleration is required for various guidance and control system designs. Thus, such motors must have a relatively low thrust and relatively long burning time of greater than 40 seconds. The longer burning time and other performance characteristics of the motor will be determined of course by the solid propellant charge. However, such increased burning time has an effect upon the nozzle design of such a solid propellant motor. In previously existing types of nozzles, if the design margin of the nozzle is to be retained, a longer burning time would normally require an increased thickness of the ablative layer which in turn would increase the motor weight and penalize vehicle performance.

The herein invention is based upon the utilization of a non-ablating radiating nozzle for solid propellant applications. Such a nozzle will of course become much hotter on its outer surface than the ablation type nozzle. Thus, a potentially limiting factor in its use is the heat conductivity to the thermally sensitive pressurized chamber and heat transfer by radiation to temperature-sensitive spacecraft components. The herein invention provides such a non-ablating radiating nozzle which can be successfully utilized by providing means for both insulating it from the rocket motor housing or chamber and spacecraft components.

Turning now to the FIGURE, there is seen a rocket motor 11 having an outer chamber or housing 13 of a suitable high strength material such as 6A14V titanium alloy. Disposed within the chamber 13 is a solid propellant grain 15 which is shown as being case bonded through an insulation layer 17 to the chamber. The particular grain shown is referred to as an end burning grain which will burn from end 19. Neither the propellent formulation nor the design of the grain forms a part of this invention. Thus, charge designs other than the end burning design shown are possible and contemplated. The end burning grain shown is especially suitable for long burning time applications, the type of interest for the nozzle under discussion, and allows, as will be explained, submergence of the throat area of a nozzle within the chamber body in order to minimize the overall length of the motor.

Disposed at the rear 19 open end of the chamber 13 is the nozzle 21 of this invention. The nozzle 21 extends from a rear enlarged end 23 to a throat area 24 submerged within the chamber. At the throat portion 24 of the nozzle there is located an insert 25 of graphite or other suitable material which can sustain the high temperature and flow conditions at the throat area. The main portion of the nozzle 23 extending from without the chamber 13 is thin-walled, having for example a thickness of only 0.065 inch, while the portion 27 adjacent to the throat area and within the chamber is thicker in order to provide increased strength at this position where the loads are most severe.

The nozzle 21 is formed of material which should have very low or no erosion at the operating conditions and firing duration of the rocket motor. Further, it should be capable of being fabricated into the relatively thin section desired in the nozzle area so as to minimize weight considerations. Additionally, the thermal conductivity of the material should be relatively low in order to minimize heat transfer to the rocket motor chamber or spacecraft components yet, in the thicker regions, high enough to maintain tolerable thermal stresses during nozzle heating.

Of considerable importance too is the weight of the material. It is obviously preferable that it be as light weight as feasible while meeting the other criteria. Typical ranges of values for the material to be utilized include a specific gravity of 1.4 to 1.5, a room temperature tensile strength in pounds per square inch within the range of 10,000 to 35,000 p.s.i. The room temperature compressive strength of the material used in pounds per square inch should generally range from 11,000 to 25,000 p.s.i. The thermal conductivity of the material in $B.t.u./ft^2/°F/hr./ft.$ should be between 2 and 12. The nozzle will generally be constructed of fibrous carbon or graphite in a carbon or graphite binder. It can be fabricated by utilizing filament winding, tape wrapping, molding of randomly oriented chopped fibers or a molded rosette pattern. The fibers can vary in size from 0.004 to 0.020 inch diameter and can comprise from 40 to 70 volume percent of the product. To form these materials the fibers are generally impregnated with pitch or resin to serve as the binder. The thus impregnated fibers are then heated at a high temperature sufficient to completely carbonize or graphitize the binder material. Upon cooling, the product is then ground or machined to the final desired nozzle contour shown. Typical resins that can be utilized as the binder include, for example, coal tar pitch organic resins.

The herein invention is not directed to the materials per se that form the nozzle, since these materials are commercially available. An example of such a material that meets the foregoing requirements is Carbitex 124, made by the Carborundum Company. This material is comprised of chopped fibers of carbon within a carbon binder and molded such as to maintain random orientation in order to produce more uniform mechanical properties in the transition. Alternately, it may include a cloth rather than chopped fiber configuration. Carbon rather than graphite is preferably used in the transition because its lower thermal diffusivity results in a lower chamber temperature. An example of material presently available that can be utilized for the nozzle portion is Carbitex 713, made by the Carborundum Company and consists of filament-wound graphite fibers in a graphite matrix in order to provide good erosion resistance and the desired strength. Alternate materials made by other commercial manufacturers are, for example, Fibergraph G—G from Reflective Laminates of Newbury Park, California, and Pyrocarb 406 made by Hitco of Los Angeles, California.

It should be pointed out that nozzles and combustion chambers of similar graphite and graphite binders have been under development for some high-performance, space storable liquid propellant applications. However, as pointed out above, the chamber is adequately cooled and thus heat dissipation from the heated nozzle to the cooled injector is not an insurmountable problem.

In the herein invention, the utilization of the nozzle 21 of the material described and having the aforegoing properties will become extremely hot during the combustion of the propellant.

On the outer periphery of the thickened section 27 of the nozzle adjacent the throat portion 24, the nozzle is threaded at 29 in order to simplify fabrication or to allow for dissimilar materials for the transition 31 and nozzle 21. Other attachment methods or a design without a joint are also possible for different nozzles and applications. The threaded portion 29 engages a separate transition section 31. The transition section 31 is an important feature of the invention, serving to isolate the motor casing 13 from the extremely hot nozzle 21. In order to increase the overall length and the mass of the insulative section 31, it is preferably frusto-conically shaped. In the particular embodiment shown, where the nozzle of the throat area 24 is within the chamber body as well as the thickened section 27 of the nozzle 21, the transition piece 31 will diverge outwardly and rearwardly from within the chamber at section 27. The length of the transition piece 31 should be long enough to provide a sufficiently long heat path so that the chamber does not become hot enough during the heating transient of the burning time of the propellant to destroy the heat treatment or lower the strength of the chamber to an unacceptable value. The transition section 31 is preferably formed of the same material as the nozzle 21, and thus is a graphite or carbonaceous fiber reinforced carbon or graphite binder.

The transition piece 31 thus extends from a throated end 33 engaging threaded portion 29 of the nozzle to an outer periphery 35 having a circumferential lip portion 37. The lip portion 37 is engaged by a circumferential separate retaining ring 39 which mates the lip 37 against the threaded end portion 41 of the chamber. Seal 43 is disposed in the outer periphery of the transition piece 31, adjacent the end of the chamber 41 serving to seal it against the escape of gas. Since the transition section or piece 31 is to insulate the chamber 13, it is important that it not be contacted directly by the hot exhaust gases. Thus, it should preferably be insulated by material such as graphite or carbon felt or an ablative asbestos phenolic 45 disposed on its surface within the combustion chamber. The felt utilized should have a low density to help increase the motor mass fraction. The felt is a firm woven cloth of rayon heavily napped and shrunk and then pyrolized at the appropriate temperature. The felt is commercially available from Carborundum Corporation and Hitco. Another material, for example, is the light weight carbon paper-phenolic resin material such as MXC–113 of Fiberite Corporation.

The felt 45, machined or ground to dimension, is bonded to the transition piece 31 by means of high temperature Sauereisen cement. It is further restrained against turbulent gases in the motor by wrapping carbon rope around the insulation snugly and tying.

A separate annular propellent section 48 is not critical to the herein concept. However, it was adopted for this design to enhance motor performance and to provide a desired acceleration time program. Additionally, the piece serves as an insulative barrier for a portion of the burn time.

During the firing of the motor, the outer surface 47 of the nozzle will reach a temperature as high as 2,600°–2,700° F; the inner surface will have approximately the same temperature. The temperature on the outer surface that would normally be achieved, as indicated above, is not acceptable for utilization with various temperature sensitive space components, such as solar panels, which could be damaged by the heat radiation from the hot surface. Thus, for those applications it is necessary that the temperature on the outer surface of the nozzle be significantly lowered. The herein invention accomplishes lowering the temperature by the unusual means of insulative layer 49 of low density carbon or graphite felt.

The insulative layer 49 is thicker than the nozzle wall in order to drop the nozzle surface temperature to values such that adjacent vehicle components can be protected with conventional insulation techniques. For example, the thickness of the insulative layer 49 could be on the order of one-quarter inch.

The insulative layer 49 is of a material that has extremely low thermal conductivity in a vacuum and serves as an effective barrier against dissipation or radiation of heat from the nozzle without being destroyed at the high nozzle temperatures encountered. In earlier nozzle designs of the ablative type outer surface temperatures of the nozzle expansion cone never reach such temperatures when properly designed so that separate insulation is not needed. In the instant case, the insulative layer 49 serves to effectively prevent the heat from leaving the nozzle walls and in fact significantly raises its temperature to the order of, for example, 3,650° F. Thus, the insulative layer 49 can only be practically utilized with a nozzle that is constructed of a material that can be raised in temperature to such a high level without any deleterious effect. The use of the insulative layer 49 can lower the temperature on its outer surface 51 to, for example, 1,600° F. or 1,000° F. less than the temperature would be on the outer surface of the nozzle not having the insulative layer. The felt insulative layer 49 is applied to the nozzle by wrapping it around the nozzle as a blanket and tied in place with carbon rope.

What is claimed is:

1. A solid propellant motor comprising:
   a housing for the propellant closed at a forward end and having an exhaust opening on opposite rear end,
   a thin-walled non-ablative expansion nozzle at said exhaust opening,
   and an elongated insulative transition section having one end connected to said nozzle and the opposite end connected to said housing for thermally insulating said housing from said nozzle by providing an elongated heat insulative path between said nozzle and said housing.

2. The motor of claim 1 wherein said housing is a metal or metal alloy.

3. The motor of claim 1 wherein said nozzle is comprised of carbonaceous fibers disposed in a carbonaceous binder.

4. The motor of claim 1 wherein said transition section is comprised of carbonaceous fibers disposed in a carbonaceous binder.

5. The motor of claim 1 wherein said transition section is a separate element from said housing and said nozzle.

6. The motor of claim 1 wherein said transition section is frusto-conical extending radially outward from said nozzle to said housing.

7. The motor of claim 6 wherein said nozzle has a constricted throat section disposed within said housing and said transition section is affixed to said nozzle within said housing.

8. The motor of claim 7 further comprising a separate insulative material disposed on said transition section within said motor housing.

9. The motor of claim 1 further comprising a separate insulative layer covering said nozzle to limit the radiation of heat therefrom.

10. The motor of claim 9 wherein said separate insulative layer is selected from the group consisting of carbon felt and graphite felt.

* * * * *